United States Patent
Fueki et al.

(10) Patent No.: US 8,087,549 B2
(45) Date of Patent: Jan. 3, 2012

(54) LIQUID SUPPLY APPARATUS AND METHOD OF DETECTING FAULT THEREOF

(75) Inventors: Manabu Fueki, Musashino (JP); Taichiro Nezu, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 1035 days.

(21) Appl. No.: 11/930,261

(22) Filed: Oct. 31, 2007

(65) Prior Publication Data

US 2008/0110924 A1    May 15, 2008

(30) Foreign Application Priority Data

Nov. 13, 2006  (JP) .................... 2006-306800
Nov. 15, 2006  (JP) .................... 2006-308912

(51) Int. Cl.
    *G01F 11/00*   (2006.01)
(52) U.S. Cl. ......... 222/263; 222/373; 222/394; 222/571
(58) Field of Classification Search ................. 222/263, 222/373, 389, 571, 394, 420
    See application file for complete search history.

(56) References Cited

U.S. PATENT DOCUMENTS

| | | | | |
|---|---|---|---|---|
| 3,877,615 | A * | 4/1975 | Anetsberger et al. | 222/263 |
| 4,156,495 | A * | 5/1979 | Weinhold | 222/1 |
| 4,262,709 | A * | 4/1981 | Mayfield | 141/67 |
| 4,634,027 | A * | 1/1987 | Kanarvogel | 222/380 |
| 6,736,291 | B1 * | 5/2004 | Mimura et al. | 222/129 |
| 2006/0129084 | A1 | 6/2006 | Miyato | |

FOREIGN PATENT DOCUMENTS

| | | |
|---|---|---|
| EP | 0694784 A1 | 1/1996 |
| JP | 62-501342 A | 6/1987 |
| JP | 5-293391 A | 11/1993 |
| JP | 6-249862 A | 9/1994 |
| JP | 8-94642 A | 4/1996 |
| JP | 2004-237150 A | 8/2004 |
| JP | 2006-64545 A | 3/2006 |
| JP | 2006-98226 A | 4/2006 |

OTHER PUBLICATIONS

Japanese Office Action issued on Sep. 27, 2011 in the corresponding Japanese Patent Application No. 2006-306800.
Japanese Office Action issued on Sep. 27, 2011 in the corresponding Japanese Patent Application No. 2006-308912.

* cited by examiner

*Primary Examiner* — Kevin P Shaver
*Assistant Examiner* — Daniel R Shearer
(74) *Attorney, Agent, or Firm* — Sughrue Mion, PLLC

(57) ABSTRACT

In a liquid supply apparatus, a liquid held in a liquid holding portion is pushed out to the exterior by pressurized gas. The apparatus includes a liquid pouring section for pouring a predetermined amount of liquid into an intermediate portion of the liquid holding portion, a liquid discharge portion which comprises a thin pipe smaller in flow passage cross-sectional area than the liquid holing portion, and is connected to one end of the liquid holding portion, a liquid storing portion which is larger in flow passage cross-sectional area than the liquid holding portion, and is connected to the other end of the liquid holding portion, and a gas feed section for feeding the pressurized gas into the liquid storing portion. The apparatus further includes at least one of first fault detection section for detecting a fault of the liquid pouring section and second fault detection section for detecting a fault of the gas feed section.

8 Claims, 11 Drawing Sheets

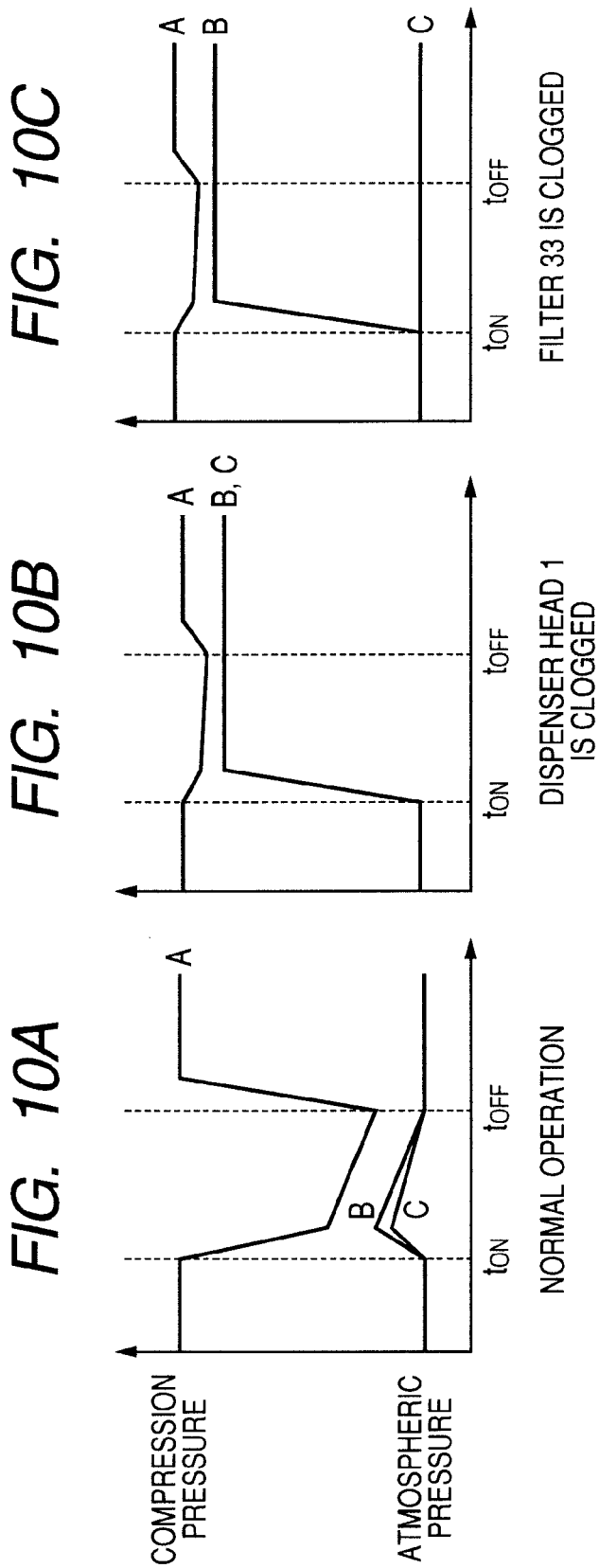

LIQUID SUPPLY APPARATUS AND METHOD OF DETECTING FAULT THEREOF

TECHNICAL FIELD

The present invention disclosure relates to a liquid supply apparatus for supplying a predetermined amount of liquid to the exterior by pressurized gas, and also relates to a method of detecting a fault of this apparatus.

RELATED ART one related-art liquid supply apparatus for supplying a predetermined amount of liquid to the exterior by pressurized gas is proposed in the following Patent Literature 1 (Japanese Patent Unexamined Publication No. 2004-237150).

FIG. 12 shows the related-art liquid supply apparatus disclosed in Patent Literature 1. A holding container 102 is a container for holding a liquid 104 therein, and a piston 103 for pushing out the liquid in a predetermined amount is provided in a receiving port of the holding container 102. The amount of pushing-out of the liquid is adjusted, or example, by a method in which scale marks are provided at predetermined intervals on the holding container 102, and a lower end of the piston 103 is pressed down to the position of that scale mark indicative of the required amount, or by control means for controlling the amount of pressing-down of the piston 103.

The piston 103 meters the liquid to be discharged to the exterior of the apparatus, and pushes it out, and the metered amount of liquid 104 pushed out by the piston 103 is projected (as at 104a) into a passageway 105 via a passageway 106. The amount of the liquid 104 to be discharged at one time to the exterior of the apparatus is finally determined by the amount of this movement of the piston 103.

A discharge nozzle 108 having a liquid discharge portion 110 is formed at one end of the passageway 105, and gas feed means 107 for feeding compressed air to the projected portion 104a of the liquid 104 is provided at the other end of the passageway 105.

The gas feed means 107 emits or ejects compressed air against the projected liquid portion 104a. By thus feeding the compressed air, the projected liquid portion 104a is separated from the main liquid portion 104 in a direction perpendicular to the direction of projecting of the projected liquid portion 104a, and also the separated liquid portion is conveyed toward the liquid discharge portion 110. The conveyed liquid portion is discharged to the exterior of the apparatus through the liquid discharge portion 110, thereby supplying the predetermined amount of liquid.

Thus, the amount of discharge of the liquid 104 is controlled by the piston 103 provided at the holding container 102, and therefore the discharge amount can be easily metered. In addition, the amount of liquid 104 equal to the amount of the liquid pushed out by the piston 103 is projected into the passageway 105, and is conveyed to the exterior of the apparatus, and therefore the predetermined amount of liquid 104 can be precisely discharged to the exterior. Furthermore, the liquid 104 is discharged by the pressure of the compressed air, and therefore the liquid 104 is prevented from remaining at the liquid discharge portion 110 and also from dripping therefrom.

In the invention of Patent Literature 1, however, the amount of the liquid 104 to be supplied to the exterior of the apparatus is limited to the liquid portion 104a projected into the passageway 105. If an attempt is made to supply the liquid of a volume larger than a flow passage capacity of the passageway 105 at one time, the liquid flows over the liquid discharge portion 110, and drips therefrom, and this is a problem. Therefore, such a construction can meet the requirement for supplying a minute quantity of liquid not larger than the volume of the passage 105, but can not supply the liquid of a volume larger than the volume of the passageway 105 at one time. Therefore, with this construction, the volume of the liquid to be supplied can not be adjusted over a wide range.

Furthermore, in the fields of biotechnology and medicine, there has been a demand that a liquid is once supplied as a reagent, a culture medium or a pharmaceutical to one place, and thereafter is drawn from this place, and then is supplied to another place. However, in the invention of Patent Literature 1, the liquid 104 needs to be beforehand filled in the holding container 102, and therefore such a demand can not be easily met.

Furthermore, in the invention of Patent Literature 1, when filling the holding container 102 with the liquid 104, it is necessary to remove the piston 103 from the holding container 102, and this is cumbersome.

Furthermore, in the invention of Patent Literature 1, there is a possibility that the liquid clogs the passageway 105, the passageway 106 or the discharge nozzle 108, so that the liquid supply operation can not be effected properly. In such a case, the clogging of the passageway 105 or other portion can not be detected with the construction of Patent Literature 1. Furthermore, when the gas feed means 107 is subjected to a malfunction, compressed air fails to be fed into the passageway 105, so that the liquid supply operation can not be effected properly. In such a case, also, the fact that there has arisen the problem with the gas feed means 107 can not be detected. Thus, when the liquid supply operation fails to be properly carried out, it can not be detected where and how such a fault has developed in the apparatus.

SUMMARY OF THE INVENTION

Exemplary embodiments of the present invention provide a liquid supply apparatus in which when supplying a liquid, the liquid is prevented from remaining in a liquid discharge portion and also from dripping therefrom, and the volume of the liquid to be supplied can be adjusted over a wide range.

Further, exemplary embodiments of the present invention provide a liquid supply apparatus and a method of detecting a fault thereof, in which when a fault adversely affecting a liquid supply operation, such as the clogging of a passageway for the passage of a liquid therethrough or a malfunction of gas feed means, develops, this fault can be detected.

According to a first aspect of the present invention, there is provided a liquid supply apparatus wherein a liquid held in a liquid holding portion is pushed out to the exterior by pressurized gas; wherein the apparatus comprises:

a liquid pouring section for pouring a predetermined amount of liquid into an intermediate portion of the liquid holding portion;

a liquid discharge portion which comprises a thin pipe smaller in flow passage cross-sectional area than the liquid holing portion, and is connected to one end of the liquid holding portion;

a liquid storing portion which is larger in flow passage cross-sectional area than the liquid holding portion, and is connected to the other end of the liquid holding portion; and a gas feed section for feeding the pressurized gas into the liquid storing portion.

In a second aspect of the present invention directed to the liquid supply apparatus of the first aspect, a connecting portion of the liquid storing portion connected to the liquid holding portion is formed into a tapering shape.

In a third aspect of the present invention directed to the liquid supply apparatus of the first aspect or the second aspect, the liquid pouring section comprises a supply passageway connected to the liquid holding portion, a syringe for pouring the liquid into the liquid holding portion via the supply passageway, and a drive section for controlling an amount of movement of a syringe piston of the syringe.

In a fourth aspect of the present invention directed to the liquid supply apparatus of the third aspect, a switching section for switching a connecting side of the syringe from the liquid holding portion to a supply source of the liquid is provided at the supply passageway.

In a fifth aspect of the present invention directed to the liquid supply apparatus of any one of the first to fourth aspects, the gas feed section comprises a compressor for pressurizing the gas, and a control section having a first mode in which the liquid held in the liquid holding portion is pushed out by the gas pressurized by the compressor and a second mode in which the liquid holding portion is open to the ambient atmosphere.

In a sixth aspect of the present invention directed to the liquid supply apparatus of any one of the first to fifth aspects, the liquid discharge portion comprises the thin pipe having a distal end portion drawn into a smaller diameter.

In a seventh aspect of the present invention directed to the liquid supply apparatus of any one of the first to sixth aspects, the liquid discharge portion comprises the thin pipe made of metal, and an inner peripheral surface of the thin pipe is finished into a mirror surface.

In an eighth aspect of the present invention directed to the liquid supply apparatus of any one of the first to seventh aspects, the liquid discharge portion comprises the thin pipe having a water repellent material coated on an inner peripheral surface thereof.

In a ninth aspect of the present invention directed to the liquid supply apparatus of any one of the first to sixth aspects, the liquid discharge portion comprises the thin pipe in the form of a tube made of Teflon (trademark).

In a tenth aspect of the present invention directed to the liquid supply apparatus of any one of the first to ninth aspects, the liquid holding portion has such a flow passage cross-sectional area that a liquid column can be formed within the liquid holding portion by an amount of the liquid corresponding to a minimum supply amount of the apparatus.

As described above, there is provided the liquid storing portion connected to the liquid holding portion, and the pressurized gas is fed into the liquid holding portion via the liquid storing portion, and with this construction there can be achieved the liquid supply apparatus in which in the liquid supply operation, the liquid is prevented from remaining at the liquid discharge portion and also from dripping therefrom, and besides the volume of the liquid to be supplied can be adjusted over a wide range.

The thin pipe is smaller in flow passage cross-sectional area than the liquid holding portion, and the liquid storing portion is larger in flow passage cross-sectional area than the liquid holding portion. With this construction, a pipe frictional resistance at a region directed from the liquid holding portion toward the liquid storing portion is smaller than a pipe frictional resistance at a region directed from the liquid holding portion toward the thin pipe. Therefore, the liquid poured into the liquid holding portion can be stored in the liquid storing portion. If the volume of the liquid storing portion is increased, an upper limit of the amount of the liquid which can be supplied at one time to the exterior of the apparatus can be increased.

The liquid is blown away by the pressurized gas in the liquid supply operation, and therefore even when the amount of the liquid to be supplied is very small, the liquid hardly remains at the distal end of the liquid discharge portion. Furthermore, the amount of the liquid to be supplied is metered by the liquid pouring section, and therefore even when the kind, concentration and temperature of the liquid to be supplied, as well as the ambient temperature, are changed, a constant volume of liquid can always be stably supplied without being affected by these factors.

In the second aspect of the present invention, the connecting portion of the liquid storing portion connected to the liquid holding portion is formed into the tapering shape, and therefore the liquid storing portion is smoothly connected to the liquid holding portion, and the pressurized gas can smoothly flow.

In the third aspect, the liquid pouring section comprises the supply passageway connected to the liquid holding portion, the syringe for pouring the liquid into the liquid holding portion via the supply passageway, and the drive section for controlling the amount of movement of the syringe piston of the syringe. Therefore, the liquid to be supplied can be metered easily and precisely.

In the fourth aspect of the present invention, there is provided the switching section for switching the connecting side of the syringe from the liquid holding portion to the supply source of the liquid, and therefore the liquid can be drawn directly into the syringe from the supply source of the liquid. It is not necessary to remove the syringe piston from the syringe when filling the liquid in the apparatus, and the filling operation can be easily effected. Furthermore, the filling of the liquid and the metering of the supply amount can be effected by the use of the single syringe.

In the fifth aspect of the present invention, in addition to the first mode in which the liquid held in the liquid holding portion is pushed out by the pressurized gas fed from the compressor, the second mode in which the liquid holding portion is open to the ambient atmosphere can be used, and therefore the liquid holding portion is made open to the atmosphere when pouring the liquid into the liquid holding portion, and by doing so, the liquid can be easily introduced into the liquid storing portion.

Furthermore, the connecting side of the liquid holding portion is sealed or closed, and the liquid discharge portion is immersed in the liquid, and in this condition a liquid drawing operation is effected by the syringe, and by doing so, the liquid can be drawn from the liquid discharge portion into the syringe via the thin pipe, the liquid holding portion and the supply passageway. Thus, both of the liquid supply operation and the drawing operation can be effected by the single liquid discharge portion.

In the sixth aspect of the present invention, the liquid discharge portion comprises the thin pipe having the distal end portion drawn into a smaller diameter, and therefore the flow passage cross-sectional area of the distal end of the thin pipe is made smaller, and the amount of the liquid remaining at the distal end can be made smaller.

In the seventh aspect of the present invention, the liquid discharge portion comprises the thin metal pipe having the inner peripheral surface finished into the mirror surface, and therefore the amount of the liquid remaining in the thin pipe at the time of discharging the liquid can be reduced.

In the eighth aspect of the present invention, the liquid discharge portion comprises the thin pipe having the water repellent material coated on the inner peripheral surface thereof, and therefore the amount of the liquid remaining in the thin pipe at the time of discharging the liquid can be further reduced. A tube made of Teflon (trademark) may be used as the thin pipe as recited in claim 9

In the tenth aspect of the present invention, the liquid holding portion has such a flow passage cross-sectional area that the liquid column can be formed within the liquid holding portion by an amount of the liquid corresponding to the minimum supply amount of the apparatus. Therefore, when a minimum amount of supply of liquid is poured into the liquid holding portion, the liquid column is formed, and when the pressurized gas is fed, the liquid can be positively conveyed to the liquid discharge portion.

According to an eleventh aspect of the present invention, there is provided a liquid supply apparatus wherein a liquid held in a liquid holding portion of a dispenser head is pushed out to the exterior by pressurized gas; wherein the apparatus comprises:

a liquid pouring section for pouring a predetermined amount of liquid into the liquid holding portion;

a gas feed section for feeding the pressurized gas into the liquid holding portion; and at least one of first fault detection section for detecting a fault of the liquid pouring section and second fault detection section for detecting a fault of the gas feed section.

In a twelfth aspect of the present invention directed to the liquid supply apparatus of the eleventh aspect, the first fault detection section comprises:

a liquid detection sensor for detecting whether or not the liquid exists within the liquid holding portion; and a fault judgment portion for judging on the basis of an output of the liquid detection sensor whether or not a fault exists in the liquid pouring section and also for judging a place where the fault exists.

In a thirteenth aspect of the present invention directed to the liquid supply apparatus of the twelfth aspect, the liquid holding portion is made of a light-transmitting material; and the liquid detection sensor is a transmission optical fiber sensor comprising a light-emitting optical fiber and a light-receiving optical fiber which are opposed to each other with the liquid holding portion held therebetween.

In a fourteenth aspect of the present invention directed to the liquid supply apparatus of the twelfth aspect, the liquid detection sensor is a capacitance-type sensor for detecting capacitance of the liquid holding portions the capacitance-type sensor having electrodes which are opposed to each other with the liquid holding portion held therebetween.

In a fifteenth aspect of the present invention directed to the liquid supply apparatus of any one of the eleventh to fourteenth aspects, the second fault detection section comprises:

at least one pressure sensor for detecting a pressure of a passageway through which the pressurized gas passes; and a fault judgment portion for judging on the basis of an output of the pressure sensor whether or not a fault exists in the gas feed section and also for judging a place where the fault exists.

In a sixteenth aspect of the present invention directed to the liquid supply apparatus of the fifteen aspect, a plurality of pressure sensors are provided respectively at a plurality of portions of the passageway through which the pressurized gas passes.

In a seventeenth aspect of the present invention directed to the liquid supply apparatus of any one of the eleventh to sixteenth aspects, when each of the first and second fault detection section detects a fault, it outputs an alarm signal.

According to an eighteenth aspect of the present invention, there is provided a method of detecting a fault of a liquid supply apparatus in which a liquid held in a liquid holding portion of a dispenser head is pushed out to the exterior by pressurized gas; wherein the method comprises:

a liquid pouring step of pouring a predetermined amount of liquid into the liquid holding portion;

a gas feeding step of feeding the pressurized gas into the liquid holding portion; and at least one of a first fault detecting step of detecting a fault in the liquid pouring step and a second fault detecting step of detecting a fault in the gas feeding step.

In a nineteenth aspect of the present invention directed to the fault detecting method of the eighteenth aspect, the first fault detecting step comprises:

a liquid detecting step of detecting whether or not the liquid exists within the liquid holding portion; and a fault judging step of judging on the basis of an output of the liquid detecting step whether or not a fault exists in the liquid pouring step and also for judging a place where the fault exists.

In a twentieth aspect of the present invention directed to the fault detecting method of the nineteenth aspect, in the liquid detecting step, light is irradiated to the liquid holding portion, and it is detected on the basis of an amount of transmitting of the light through the liquid holding portion whether or not the liquid exists within the liquid holding portion.

In a twenty-first aspect of the present invention directed to the fault detecting method of the nineteenth aspect, in the liquid detecting step, it is detected on the basis of a capacitance value of the liquid holding portion whether or not the liquid exists within the liquid holding portion.

In a twenty-second aspect of the present invention directed to the fault detecting method of any one of the eighteenth to twenty-first aspects, the second fault detecting step comprises:

a pressure detecting step of detecting a pressure of a passageway through which the pressurized gas passes; and a fault judging step of judging on the basis of an output of the pressure detecting step whether or not a fault exists in the gas feeding step and also for judging a place where the fault exists.

In a twenty-third aspect of the present invention directed to the fault detecting method of the twenty-second aspect, in the pressure detecting step, the pressure is detected at the plurality of portions of the passageway through which the pressurized gas passes.

In a twenty-fourth aspect of the present invention directed to the fault detecting method of any one of the eighteenth to twenty-third aspects, in each of the first and second fault detecting steps, when a fault is detected, an alarm signal is outputted.

As described above, there is provided at least one of the first fault detecting step of detecting a fault in the liquid pouring step and the second fault detecting step of detecting a fault in the gas feeding step, and by doing so, there can be achieved the liquid supply apparatus and the fault detecting method, in which when a fault adversely affecting the liquid supply operation, such as the clogging of the passageway for the passage of the liquid therethrough or a malfunction of the gas feed section, develops, this fault can be detected. And besides, by providing the first fault detection section or the second fault detection section, a place where a fault has developed, as well as contents of the fault, can be specified, and therefore the time required for restoration after the development of the fault can be reduced.

In case both of the first fault detection section and the second fault detection section are provided, detection results of the first and second fault detection section can be used, and the precision of the fault detection can be enhanced.

With respect to the detection of a fault in the liquid pouring section, it is detected whether or not the liquid exists within the liquid holding portion, and this detection result is checked against the state of progress of the liquid pouring operation, and by doing so, it can be checked whether or not any fault has developed in the liquid pouring section. Further, by checking the detection result against the state of progress of the gas feeding operation by the gas feed section, it can be determined whether or not any fault has developed in the gas feed section.

Whether or not the liquid exists within the liquid holding portion may be detected by a change in light transmission rate with the use of the transmission optical fiber, or may be detected by a change in capacitance with the use of the electrodes.

With respect to the detection of a fault in the gas feed section, the pressure of the passageway through which the pressurized gas passes is detected, and this detection result is checked against the state of progress of the gas feeding operation, and by doing so, it can be checked whether or not any fault has developed in the gas feed section.

Furthermore, in case the pressure is detected at the plurality of portions of the passageway through which the pressurized gas passes, a place where a fault has developed can be easily specified by comparing pressure values.

Furthermore, in case the alarm signal is outputted when any fault is detected, the user of the liquid supply apparatus can easily recognize the development of the fault.

Other features and advantages may be apparent from the following detailed description, the accompanying drawings and the claims.

BRIEF DESCRIPTION OF THE DRAWINGS

FIGS. 10A to 10C are graphs showing measurement results of pressure sensors 71a to 71c.

DETAILED DESCRIPTION OF THE PREFERRED EMBODIMENTS

A liquid supply apparatus of the present invention will now be described with reference to the drawings.

First Embodiment

Figure 1:
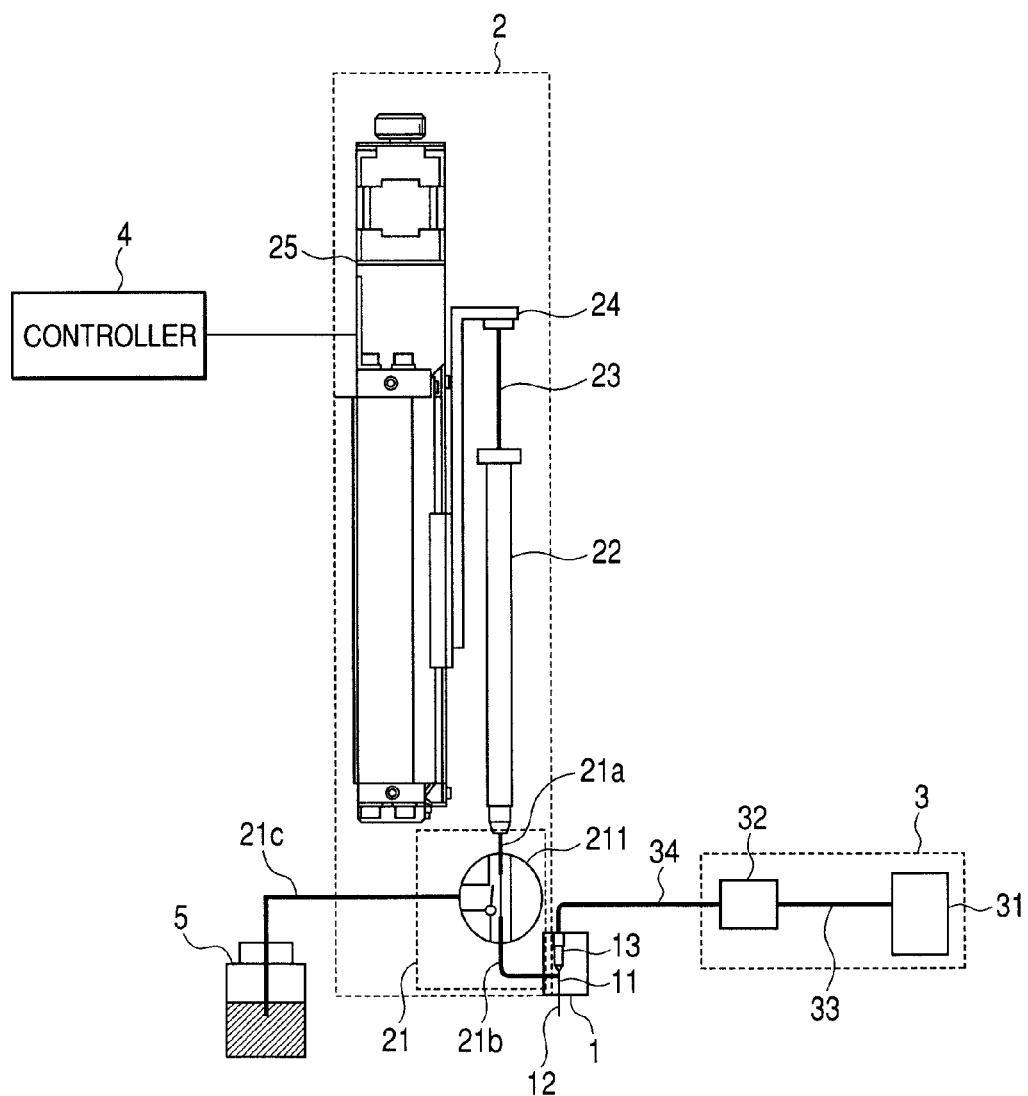
FIG. 1 is a view showing one preferred embodiment of a liquid supply apparatus of the present invention.

FIG. 1a view showing one preferred embodiment of a liquid supply apparatus of the present invention. The liquid supply apparatus of this embodiment comprises a dispenser head 1 for discharging a liquid to the exterior of the apparatus, liquid pouring means 2 for supplying the liquid to the dispenser head 1, gas feed means 3 for feeding pressurized gas to the dispenser head 1, and a controller 4. A liquid bottle 5 is a supply source of the liquid.

The liquid pouring means 2 comprises a syringe 22, a syringe piston 23 received in the syringe 22, a piston drive rod 24 connected to the syringe piston 23, a single axis drive slider 25 for controlling the driving of the piston drive rod 24, and a supply passageway 21 connecting a distal end of the syringe 22 to the dispenser head 1.

The single axis drive slider 25 comprises a linear slider, a stepping motor, a ball screw, etc., and is responsive to a drive signal from the controller 4 so as to move the piston drive rod 24 by a desired distance in a direction of an axis of the syringe piston 23.

The syringe 22 can store the liquid therein, and by moving the syringe piston 23 downward (in FIG. 1), the liquid within the syringe 22 can be pushed cut from the distal end of the syringe 22 into the supply passageway 21.

The supply passageway 21 has switch means 211 provided between the syringe 22 and the dispenser head 1. The connection side of the syringe 22 can be switched from the dispenser head 1 to the liquid bottle 5. A three-port connection valve can be used as the switching means 211. The switching means 211 selects the connection side in accordance with a signal from the controller 211.

The gas feed means 3 comprises a compressor 31 for compressing the gas, and control means 32. The compressor 31 is connected to the dispenser head 1 via gas tubes 33 and 34. The control means 32 is provided between the compressor 31 and the dispenser head 1, and an open-close control for feeding the compressed gas of the compressor 31 to the dispenser head 1 is effected by the control means 32. The open-close control of the control means 32 is effected by a signal from the controller 4.

Figure 2:
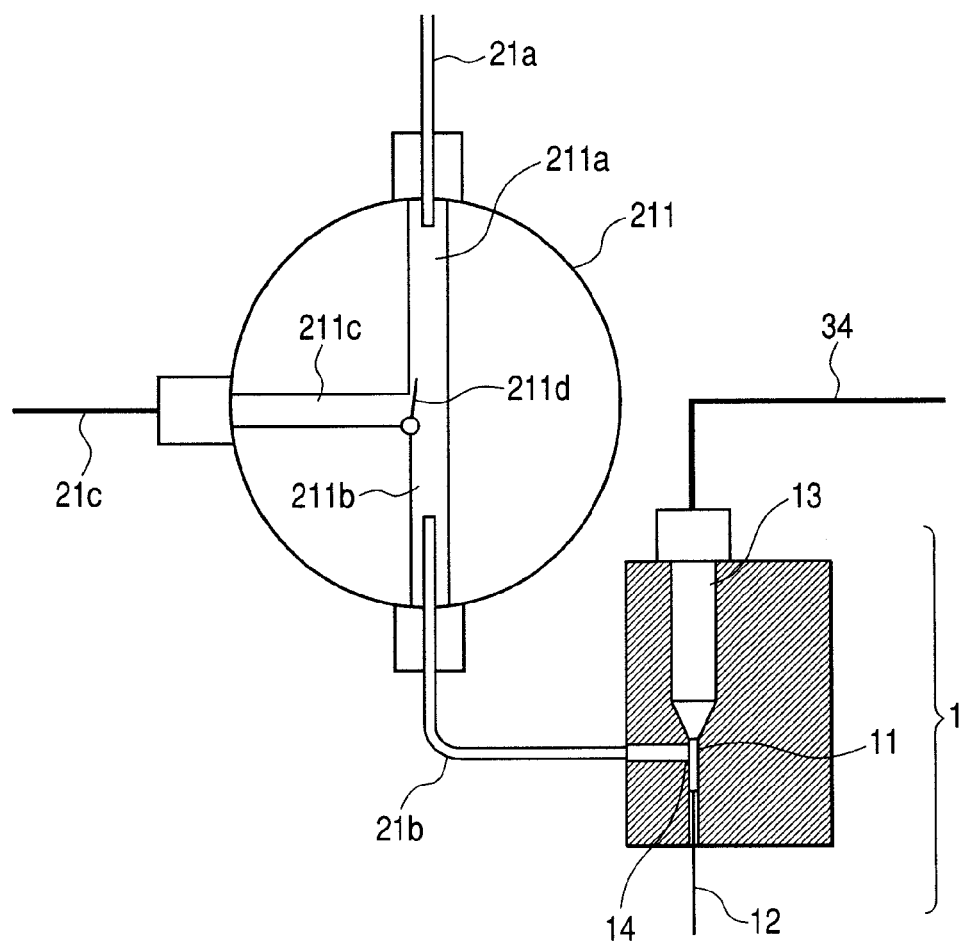
FIG. 2 is an enlarged view showing a supply passageway 21 and a dispenser head 1.

FIG. 2 is an enlarged view showing the supply passageway 21 and the dispenser head 1. Reference numeral 21a denotes a liquid tube connecting the distal end of the syringe 22 to the switching means 211, reference numeral 21b denotes a liquid tube connecting the switching means 211 to the dispenser head 1, and reference numeral 21c denotes a liquid tube connecting the switching means 211 to the liquid bottle 5. Reference numerals 211a, 211b and 211c denote flow passageways within the switching means 211, and are connected respectively to the liquid tubes 21a, 21b and 21c. Reference numeral 211d denotes a valve provided within the switching means 211. This valve 211d is controlled by a signal from the controller 4 so as to connect the flow passageway 211a to one of the flow passageways 211b and 211c.

Within the dispenser head 1, the liquid tube 21b and a liquid holding portion 11 intersect each other to form an intersection portion 14. A liquid storing portion 13 is connected to one end of the liquid holding portion 11, and a liquid discharge portion 12 is connected to the other end thereof.

The liquid storing portion 13 has such a capacity that an amount of liquid to be supplied at one time to the exterior can be stored in this liquid storing portion 13. The liquid storing portion 13 has a cylindrical shape, and its connecting portion connected to the liquid holding portion 11 is formed into a tapering shape, so that this liquid storing portion 13 is smoothly connected to the liquid holding portion 11. The liquid storing portion 13 is connected to the control means 32 via the gas tube 34.

The liquid discharge portion 12 comprises a thin pipe smaller in a flow passage cross-sectional area than the liquid holding portion 11. The liquid storing portion 13 is larger in flow passage cross-sectional area than the liquid holding portion 11. By thus providing the difference in the flow passage cross-sectional area, a pipe frictional resistance at a region directed from the intersection portion 14 toward the liquid storing portion 13 is made smaller than a pipe frictional resistance at a region directed from the intersection portion 14 toward the liquid discharge portion 12.

Figure 3:
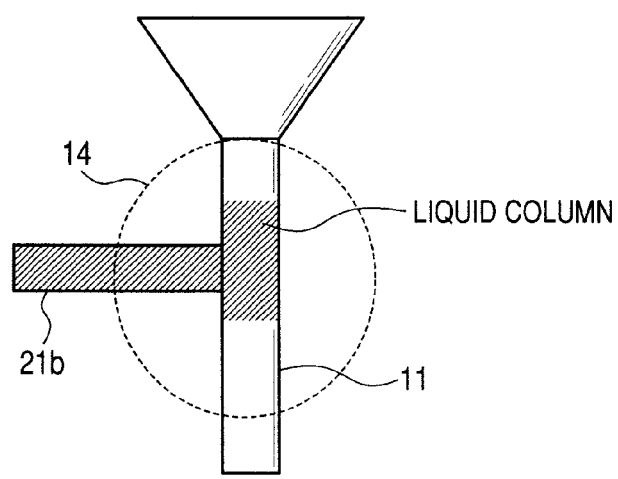
FIG. 3 is an enlarged view showing a liquid holing portion

FIG. 3 is an enlarged view showing the liquid holding portion 11. The liquid holding portion 11 has such a flow passage cross-sectional area that a liquid column can be formed by an amount of liquid corresponding to a minimum supply amount of the apparatus. The syringe 22 is connected to the dispenser head 1 by operating the switching means 211, and in this condition when the syringe piston 23 of the liquid pouring means 2 is moved in an amount corresponding to the minimum supply amount, the liquid is stored in the liquid holding portion 11 via the supply passageway 21. The flow passage cross-sectional area of the liquid holding portion 11 is so determined that this stored liquid can form a liquid column within the liquid holding portion 11.

Figure 4:
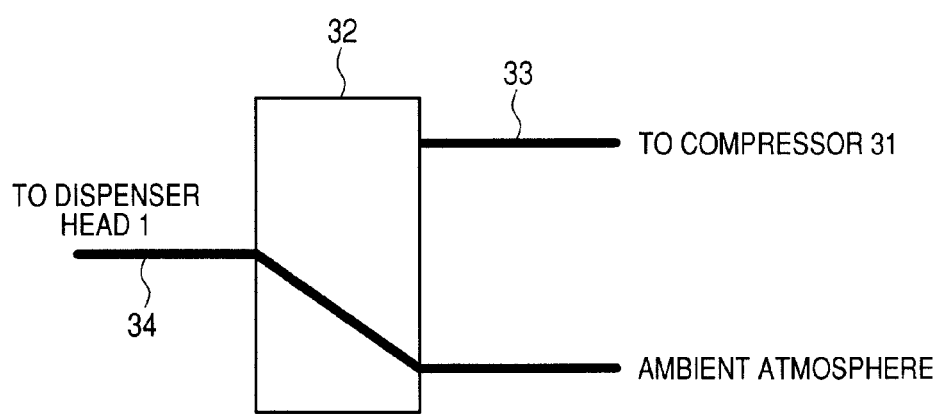
FIG. 4 is a diagram showing the construction of control means 32.

FIG. 4 is a diagram showing the construction of the control means 32. The control means 32 can comprise, for example, a solenoid valve, and this control means 32 is constructed such that the gas tube 34 (connected to the dispenser head 1) can be selectively connected to one of the gas tube 33 (connected to the compressor 31) and the ambient atmosphere. The control means 32 may be formed by one solenoid valve or by a plurality of solenoid valves so as to effect the above operation.

Incidentally, the liquid supply apparatus is mounted on X-, Y- and Z-stages (not shown) moved by signals from the controller 4, and is moved to a destination position where the liquid supply is effected.

The operation of the liquid supply apparatus of this embodiment will be described below.

Referring to the important points of the liquid supply operation, the syringe piston 23 is moved in an amount corresponding to a desired supply volume to thereby feed the liquid to the intersection portion 14, and the liquid held in the liquid holding portion 11 and the liquid storing portion 13 is ejected from the liquid discharge portion 12 by the air compressed by the compressor 31, thereby supplying the liquid.

First, as a preparatory stage of the liquid supply operation, an operation for storing the liquid in the syringe 22 is effected. In response to a signal from the controller 4, the single axis drive slider 25 is driven to move the syringe piston 23 to a lowermost position of the syringe 22. Also, the valve 211d of the switching means 211 is controlled to thereby connect the flow passageway 211a to the flow passageway 211c, so that the syringe 22 is connected to the liquid bottle 5.

Then, the single axis slider 25 is driven, thereby drawing the liquid from the liquid bottle 5 into the syringe 22.

In the case where the liquid tubes 21c and 21a are filled with the liquid, the liquid is filled in the syringe 22 by the drawing operation effected by the syringe 22 and the syringe piston 23.

However, generally, at an initial stage of use of the liquid supply apparatus, the liquid is not filled in the liquid tubes 21c and 21a. In such a case, the syringe piston 23 is once driven to effect a drawing operation, and by doing so, the air within the liquid tubes 21c and 21a is introduced into the syringe 22, and then the valve 211d of the switching means 211 is switched to connect the flow passageway 211a (the syringe (22) side) to the flow passageway 211b (the dispenser head (1) side), and the single axis drive slider 4 is driven to move the syringe piston 23 into a position where the syringe 22 is in a fully-discharged condition. As a result of this operation, the air introduced from the liquid tube 21c and 21a into the syringe 22 is discharged from the liquid discharge portion 11.

Thereafter, the valve 211d is controlled to connect the flow passageway 211a to the flow passageway 211c, and a drawing operation is again effected by the syringe 22 and the syringe piston 23. By thus repeating this operation, the liquid tubes 21a and 21c are filled with the liquid, and finally the liquid can be stored in the syringe 22.

After the operation for storing the liquid in the syringe 22 is finished, the valve 211d of the switching means 211 is switched to connect the flow passageway 211a (the syringe (22) side) to the flow passageway 211b (the dispenser head (1) side), and the syringe piston 23 is moved in the discharging direction to cause the liquid to reach the intersection portion 14.

Then, an amount of liquid to be supplied at one time to the exterior is metered. The syringe piston 23 is moved in an amount corresponding to a desired supply volume of liquid, so that the liquid is pushed out from the intersection portion 14, and is held in the liquid holding portion 11.

Depending on the volume to be supplied, the liquid may be stored also in the liquid storing portion 13. The pipe frictional resistance of the thin pipe is larger than the pipe frictional resistance of the liquid storing portion 13, and therefore the liquid is stored in the liquid storing portion 13 without flowing into the liquid discharge portion 12.

The volume of supply of the liquid is determined by the amount of movement of the syringe piston 23 received in the syringe 22, and therefore even when the kind, concentration and temperature of the liquid to be supplied, as well as the ambient temperature, are changed, a constant volume of liquid can always be stably metered without being affected by these factors.

When the liquid is to be poured from the syringe 22 into the liquid holding portion 11, the gas tube 34 is made open to the ambient atmosphere by operating the control means 32, so that the air within the liquid holding portion 11 and the liquid storing portion 13 is discharged therethrough. Also, the compressor 31 of the gas feed means 3 is operated to supply the compressed air to the gas tube 33.

Thus, the preparations for the liquid supply operation are finished. Incidentally, this preparatory operation is effected not at a target position (where the liquid supply is effected) but at a position where the liquid discharge portion 12 is disposed above a separately-prepared waste liquid container.

For effecting the liquid supply, the valve of the control means 32 is switched from the ambient atmosphere side to the gas tube (33) side (the compressor (31) side). The pressurized gas exists within the gas tube 33, and therefore when the valve of the control means 32 is switched to the gas tube 33, the pressurized gas is fed toward the liquid storing portion 13. By thus feeding the pressurized gas, the liquid stored in the liquid storing portion 13 and the liquid holding portion 11 is ejected from the distal end of the liquid discharge portion 12, thus supplying the liquid to the exterior of the apparatus. After the liquid supply is finished, the valve of the control means 32 is switched to connect the gas tube 34 to the ambient atmosphere.

When another liquid supply operation is to be effected after the first liquid supply operation, the syringe piston 23 is again moved in an amount corresponding to the desired supply volume to push the liquid out to the intersection portion 14, and the liquid is stored in the liquid holding portion 11 and the liquid storing portion 13. Then, the valve of the control means 32 is switched from the ambient atmosphere side to the gas tube (33) side (the compressor (31) side), and the liquid stored in the liquid holding portion 13, etc., is ejected to the exterior of the apparatus.

When the amount of the liquid stored in the syringe 22 becomes small, the valve 211d of the switching means 211 is switched to connect the flow passage 211a (the syringe (22) side) to the flow passage 211c (the liquid container (5) side), and the operation for drawing the liquid into the syringe 22 is effected, thereby again storing the liquid in the syringe 22.

The liquid is blown away and ejected by the pressurized gas, and therefore even when the amount of supply of the liquid is very small, the liquid hardly remains at the distal end of the liquid discharge portion 12, and the liquid is prevented from remaining at the liquid discharge portion 12 and also from dripping therefrom.

And besides, there is provided the liquid storing portion 13 connected to the liquid holding portion 11, and therefore the liquid poured into the liquid holding portion 11 can be stored in the liquid storing portion 13. If the volume of the liquid storing portion 13 is increased, an upper limit of the amount of the liquid which can be supplied at one time to the exterior of the apparatus can be increased, and the volume of the liquid to be supplied can be adjusted over a wide range.

Furthermore, the connecting portion between the liquid storing portion 13 and the liquid holding portion 11 is formed into a tapering shape, and therefore the liquid storing portion 13 is smoothly connected to the liquid holding portion 11 so that the pressurized gas can smoothly flow therethrough.

The dispenser head 1 comprises a body made of a water repellent material, and the thin pipe (serving as the liquid discharge portion) mounted on this body. For example, Teflon (registered trademark) is used as the water repellent material, and a thin metal pipe or a tube made of Teflon is used as the thin pipe. In the case of using the thin metal pipe, an inner peripheral surface of the thin pipe made, for example, of stainless steel is finished into a mirror surface, and is coated with Teflon (trademark), and with this construction the amount of liquid remaining in the thin pipe can be reduced. Furthermore, when a distal end portion of the thin pipe is drawn into a smaller diameter to reduce a flow passage cross-sectional area thereof, the amount of the liquid deposited on (remaining at) the distal end of the thin pipe can be reduced.

Second Embodiment

In the liquid supply apparatus of the above first embodiment, the liquid discharge portion 12 serves only to supply the liquid to the exterior of the apparatus. However, in this second embodiment, a liquid discharge portion can serve also to effect an operation for drawing a liquid.

Figure 5:
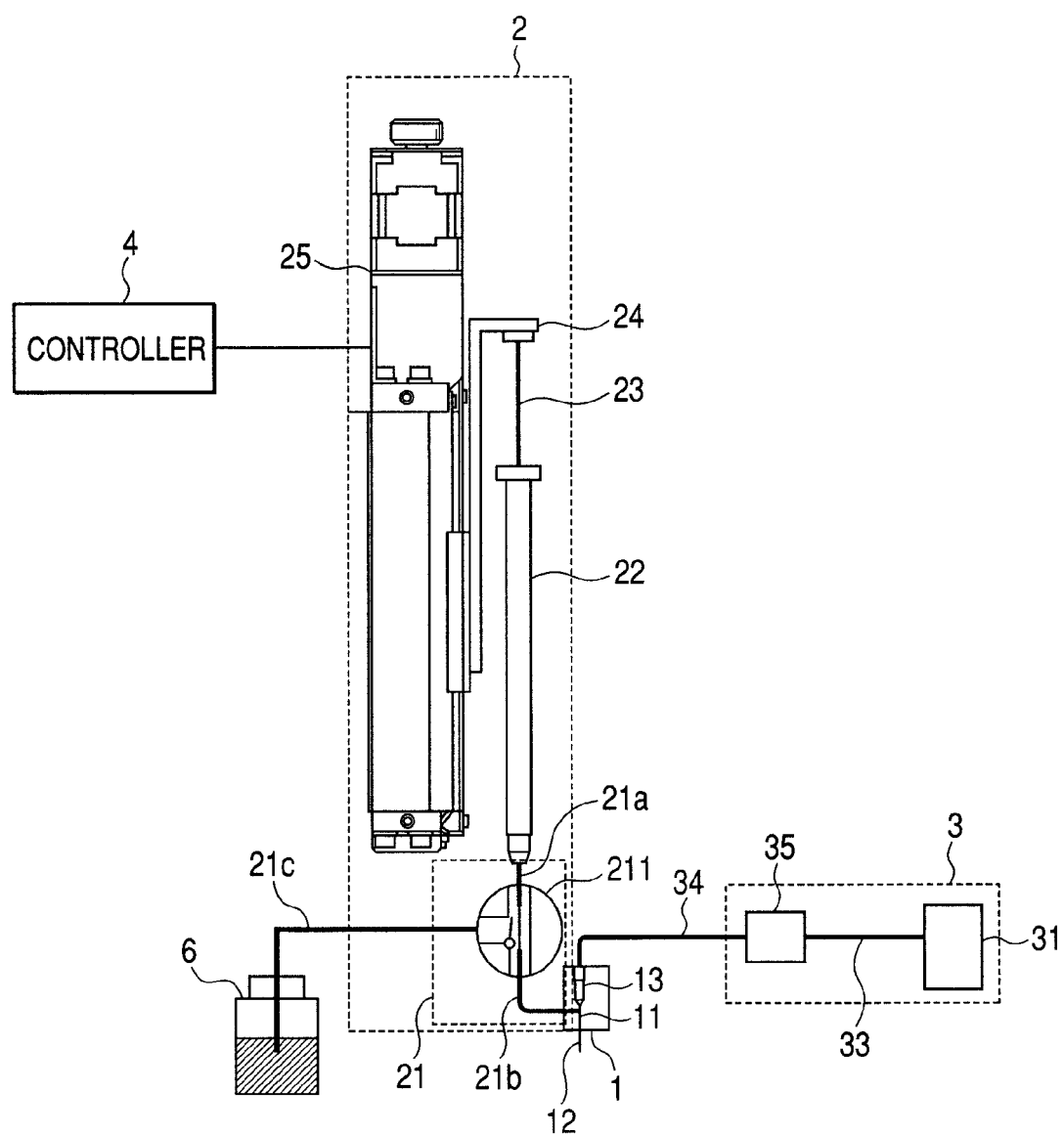
FIG. 5 is a view showing another embodiment of a liquid supply apparatus of the present invention.

FIG. 5 is a view showing the second embodiment of a liquid supply apparatus of the present invention. The liquid supply apparatus of this embodiment is generally similar to the liquid supply apparatus of the first embodiment, and differs therefrom only in that control means has a different construction and that a washing liquid bottle 6 holding a washing liquid is connected to switching means 211.

Figure 6:
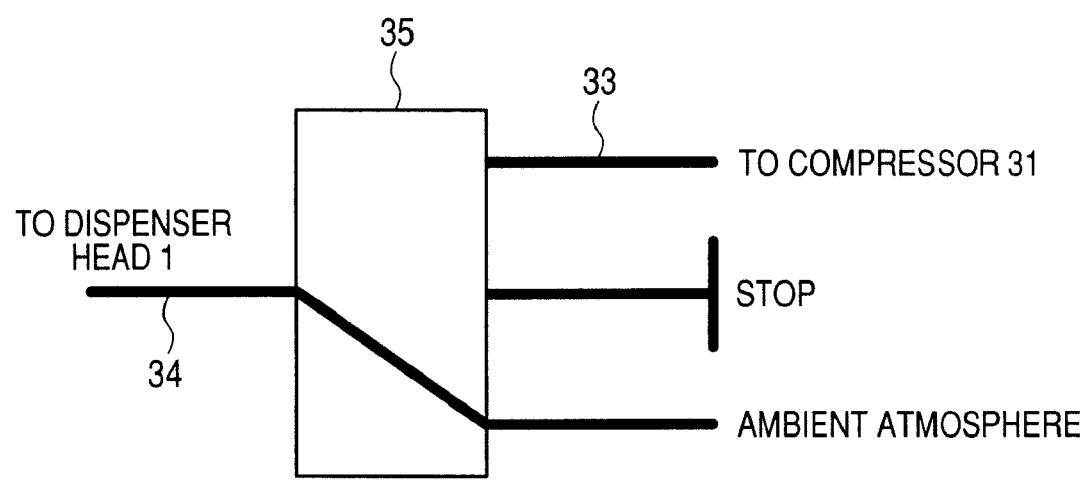
FIG. 6 is a diagram showing the construction of control means 35.

FIG. 6 is a diagram showing the construction of the control means 35. For example, the control means 35 can comprise, for example, a solenoid valve, and this control means 35 is constructed such that a gas tube 34 (connected to a dispenser head 1) can be selectively connected to one of a gas tube 33 (connected to a compressor 31), the ambient atmosphere and a stop side. When the gas tube 34 is connected to the stop side, the connecting side of the gas tube 34 is sealed or closed.

The control means 35 may be formed by one solenoid valve or by a plurality of solenoid valves so as to effect the above operation.

In the liquid supply apparatus of this construction, a liquid to be supplied is designated by reference character A.

First, the liquid A is held in a container or the like. The liquid supply apparatus is moved into a position where a distal end of a thin pipe of the liquid discharge portion 12 can be inserted in this container so that the liquid discharge portion 12 can draw the liquid A up.

The control means 35 is switched to the stop side. The switching means 211 is operated to connect a flow passageway 211a (connected to a syringe 22) to a flow passageway 211b (connected to the dispenser head 1).

In response to a signal from a controller 4, a single axis drive slider 25 is driven to raise a syringe piston 23, so that the liquid is drawn through the thin pipe of the liquid discharge portion 12, and this liquid A is flowed into the syringe 22 via a liquid holding portion 11, a liquid tube 21b, the switching means 211 and a liquid tube 21a.

When a desired amount of liquid A is drawn into the syringe 22, the valve of the control means 35 is once switched from the stop side to the gas tube (34) side (the compressor (31) side), and pressurized air is fed to the liquid holding portion 11, thereby removing the liquid A, existing within the liquid holding portion 11 and the thin pipe, therefrom. Then, the position of the liquid supply apparatus is adjusted so that the distal end of the thin pipe of the liquid discharge portion 12 is located at a target position of the liquid supply.

The operation for supplying the liquid is similar to that of the first embodiment. The valve of the control means 35 is switched to the ambient atmosphere side, and the syringe piston 23 is moved in an amount corresponding to a desired supply volume of the liquid A. The liquid A is poured into the liquid holding portion 11, and in case the volume of the poured liquid A is large, the liquid is stored in a liquid storing portion 13. Thereafter, the valve of the control means 35 is switched to the gas tube (34) side (the compressor (31) side), and the pressurized gas is fed to the liquid storing portion 13, thereby ejecting the liquid A from the thin pipe, thus effecting the liquid supply.

When the same liquid A is to be supplied after the above liquid supply operation, the liquid pouring operation and the gas feeding operation are again effected. When a different liquid B is to be supplied, the liquid A within the syringe 22 is discharged therefrom, those portions (including the liquid holding portion 11 and the liquid tubes 21a and 21b) through which the liquid A has flowed are washed.

The switching means 211 is switched to connect the liquid tube 21a (connected to the syringe 22) to the liquid tube 21b (connected to the washing liquid bottle 6), and the washing liquid is drawn from the washing liquid bottle 6 into the syringe 22. After the washing liquid is thus drawn into the syringe 22, the switching means 211 is switched to connect the liquid tube 21a (connected to the syringe 22) to the liquid tube 21b (connected to the dispenser head 1), and the washing liquid is poured into the dispenser head 1. The control means 35 is switched to connect the gas tube 34 to the gas tube 33 (the compressor (31) side)), and the pressurized gas is fed to the dispenser head 1, and the interior of the dispenser head 1 is washed with the washing liquid.

Thereafter, the liquid supply apparatus is moved into a position where the thin pipe can draw the liquid B up from a container holding this liquid B, and the liquid B is drawn up and is supplied.

With this construction, the liquid can be drawn into the syringe 22 also from the liquid discharge portion 12, and the liquid discharge portion 12 can serve to effect the liquid supply operation and also to effect the liquid drawing operation.

The construction of this embodiment is generally similar to that of the first embodiment, and therefore by using the control means 35 in a manner similar to the control means of FIG. 4, this embodiment can be used in a manner similar to the first embodiment. Furthermore, in case the liquid bottle and the washing liquid bottle are selectively used according to a situation in which the liquid supply apparatus is appropriately used by the user, the liquid supply apparatus can be operated as in the first embodiment and also as in this second embodiment.

Third Embodiment

Figure 7:
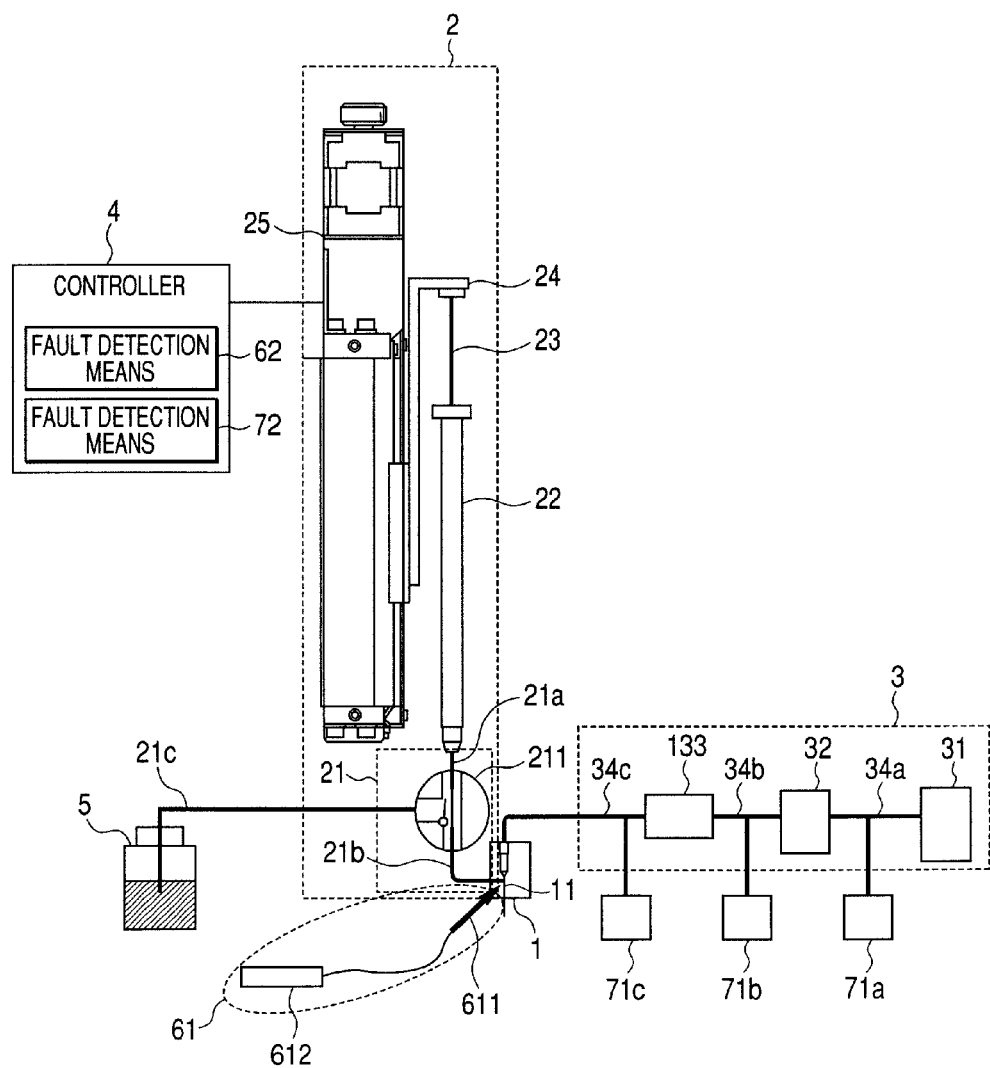
FIG. 7 is a view showing a further embodiment of a liquid supply apparatus of the present invention and a method of detecting a fault of this apparatus.

FIG. 7 is a view showing a further embodiment of a liquid supply apparatus and a method of detecting a fault of this liquid supply apparatus.

Those members identical to those of the first embodiment will be designated by identical reference numerals, respectively, and detailed description thereof will be omitted.

The liquid supply apparatus of this embodiment further comprises first fault detection means 6 (61, 62) for detecting a fault of liquid pouring means 2, and second fault detection means 7 (71, 72) for detecting a fault of gas feed means 3.

The gas feed means 3 comprises a compressor 31 for compressing gas, control means 32, and a filter 133. The compressor 31 is connected to a dispenser head 1 via the control means 32 and the filter 133. A gas tube 34a connects the compressor 31 to the control means 32, and a gas tube 34b connects the control means 32 to the filter 133, and a gas tube 34c connects the filter 133 to the dispenser head 1. The control means 32 effects an open-close control for feeding the compressed gas of the compressor 31 to the dispenser head 1. The control means 32 can comprise, for example, a solenoid valve. The open-close control of the control means 32 is effected by a signal from a controller 4.

The filter 133 is provided for preventing dirt, oil, etc., from flowing into the dispenser head 1, and an air filter or a mist filter is used as the filter 133. In FIG. 7, although the filter 133 is provided between the dispenser head 1 and the control means 32, it is, in some cases, provided between the control means 32 and the compressor 31. In other cases, two filters (133) may be provided respectively at the above locations.

The first fault detection means 6 comprises a transmission optical fiber sensor 611 mounted on the dispenser head 1, an optical fiber amplifier 612 for amplifying a signal of this transmission optical fiber sensor 611, and a fault judgment portion 62 into which a signal from the optical fiber amplifier 612 is inputted. The transmission optical fiber sensor 611 and the optical fiber amplifier 612 jointly form a liquid detection sensor 61. In this embodiment, the fault judgment portion 62 is provided within the controller 4 although a place where this fault judgment portion 62 is provided is not particularly limited.

The second fault detection means 7 comprises pressure sensors 71a to 71c, and a fault judgment portion 72. The pressure sensors 71a to 71c measure values of pressures of the gas tubes 34a to 34c, respectively, and results of these measurements are inputted into the fault judgment portion 72. In this embodiment, the fault judgment portion 72 is provided within the controller 4 although a place where this fault judgment portion 72 is provided is not particularly limited.

Preferably, the pressure sensors are provided upstream and downstream of each of those constituent elements (for example, the control means 32 and the filter 133) of the gas feed means in which a fault is liable to develop. In this embodiment, the pressure sensor 71a is provided so as to measure a pressure of the gas tube extending between the compressor 31 and the control means 32, and the pressure sensor 71b is provided so as to measure a pressure of the gas tube extending between the control means 32 and the filter 133, and the pressure sensor 71c is provided so as to measure a pressure of the gas tube extending between the filter 133 and the dispenser head 1. With this arrangement of the pressure sensors, the pressure at a region upstream of the control means 32 can be detected by the pressure sensor 71a, while the pressure at a region downstream of the control means 32 can be detected by the pressure sensor 71b. Similarly, the pressure at a region upstream of the filter 133 can be detected by the pressure sensor 71b, while the pressure at a region downstream of the filter 133 can be detected by the pressure sensor 71c.

The fault judgment portion 72 checks pressure values, inputted thereinto from the respective pressure sensors, against the state of progress of the gas feeding operation, and judges that a fault has developed in the gas feed means 3 when the pressure value of any of the pressure sensors which should be high is low and also when the pressure value of any of the pressure sensors which should be low is high.

Figure 8:
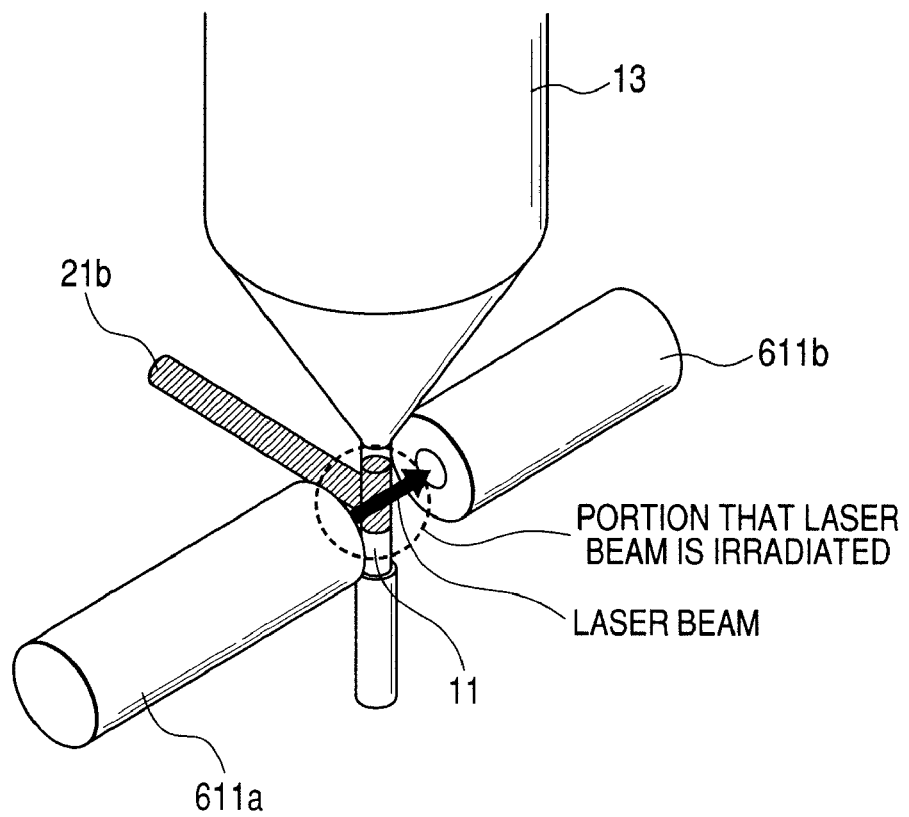
FIG. 8 is an enlarged view showing an intersection portion 14 and a transmission optical fiber 611.

FIG. 8 is an enlarged view showing an intersection portion 14 and the transmission optical fiber 611. A light-emitting optical fiber 611a and a light-receiving optical fiber 611b of the transmission optical fiber sensor 611 are disposed in opposed relation to each other in such a manner that a laser beam can pass through that portion of a liquid holding portion 11 disposed at the intersection portion 14. The liquid holding portion 11 is made of a material (such as PFA) allowing a laser beam to be transmitted therethrough. The dispenser head 1 is constructed such that the transmission optical fiber sensor 611 can be mounted on the liquid holding portion 11.

Figure 9A:
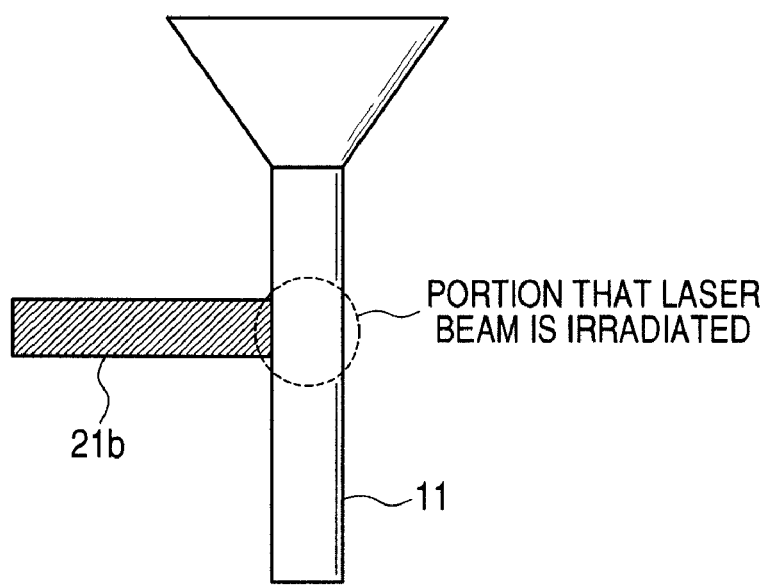
FIGS. 9A and 9B are views explanatory of the detection of a liquid by a liquid detection sensor 61.
Figure 9B:
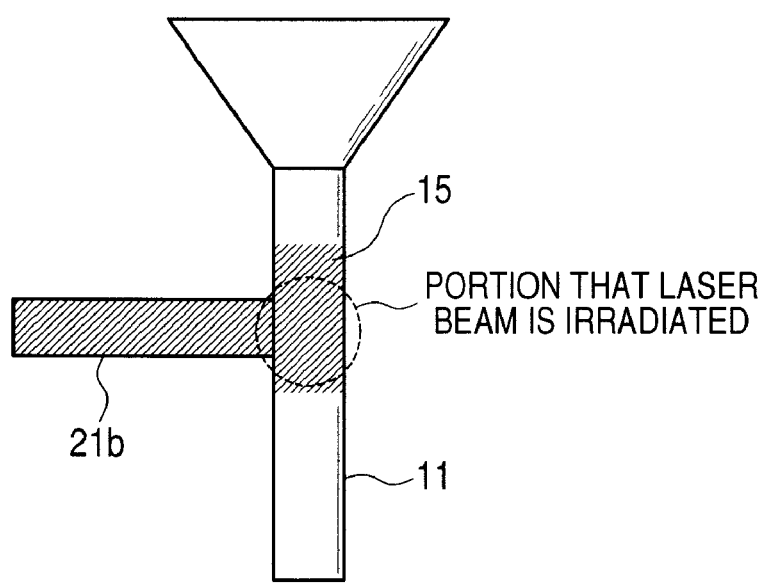

FIGS. 9A and 9B are views explanatory of the detection of a liquid by the liquid detection sensor 61, and FIG. 9A shows a condition in which the liquid is not held in the liquid holding portion 11, and FIG. 9B shows a condition in which the liquid is held in the liquid holding portion 11.

For example, the liquid to be supplied to the exterior of the apparatus is transparent or translucent. After a liquid supply operation is finished, the liquid exists within a liquid tube 21b, but the liquid does not exist within the liquid holding portion 11 as shown in FIG. 9A. When a laser beam is irradiated to the liquid holding portion 11, light (beam) is reflected by a flow passage wall of the liquid holding portion 11, so that a light transmission rate is lower.

Next, when a syringe piston 23 is moved to pour a desired amount of liquid into the dispenser head 1 (that is, to set the liquid), a liquid column 15 is formed within the liquid holding portion 11 as shown in FIG. 9B. As a result, a refractive index of the material of the dispenser head 1 is close to a refractive index of the liquid, so that the rate of transmission of a laser beam increases. Thus, the liquid detection sensor 611 judges from the difference in the laser beam transmission rate whether or not the liquid exists within the liquid holding portion 11.

In the case where the liquid to be supplied is opaque, the laser beam transmission rate is lower when the liquid exists within the liquid holding portion 11. Therefore, judgment standards are beforehand established taking into consideration the relation between the kind of liquid to be supplied and a change of the laser beam transmission rate.

The transmission optical fiber 611 outputs a signal to the optical fiber amplifier 612, and a change in the transmission rate is monitored in the optical fiber amplifier 612.

The liquid supply operation of the liquid supply apparatus of this construction will be described below. Referring to the important points of the liquid supply operation, the syringe piston 23 is moved in an amount corresponding to a desired supply volume to feed the liquid to the intersection portion 14, and the liquid held in the liquid holding portion 11 and a liquid storing portion 13 is ejected from a liquid discharge portion 12 by the air compressed by the compressor 31, thereby supplying the liquid.

First, a liquid is drawn into a syringe 22 from a liquid bottle 5, and then the syringe piston 23 is moved in a discharging direction to cause the liquid to reach the intersection portion 14.

Then, the syringe piston 23 is moved in an amount corresponding to a desired volume of liquid to be supplied at one time to the exterior, thereby pushing the liquid out from the intersection portion 14, so that the liquid is held in the liquid holding portion 11. In case a flow passage cross-sectional area of the liquid storing portion 13 is larger than a flow passage cross-sectional area of a thin pipe of the liquid discharge portion 12, the liquid is stored in the liquid storing portion 13 without leaking from a distal end of the thin pipe because of the difference in pipe frictional resistance.

After the pouring of the liquid into the liquid holding portion 11 is finished, the valve of the control means 32 is opened, so that the pressurized gas is fed from the compressor 31 toward the liquid storing portion 13. By thus feeding the compressed gas, the liquid stored in the liquid storing portion 13 and the liquid holding portion 11 is ejected from the distal end of the liquid discharge portion 12, thus supplying the liquid to the exterior of the apparatus.

In a series of steps of the liquid supply operation, there is a possibility that the liquid clogs any of the syringe 22, each liquid tube, the liquid holding portion 11 and the liquid discharge portion 12, so that the liquid fails to properly flow. Also, there is a possibility that in the flow path from the compressor 31 to the dispenser head 1, the pressurized gas fails to be properly fed because of a malfunction of the control means 32 or the clogging of the filter 133. The first fault detection means for detecting a fault developing in the liquid pouring system, as well as the second fault detection means for detecting a fault developing in the gas feed system, will be described below.

First, the operation of the first fault detection means 6 will be described. Here, it is also assumed that the liquid is transparent or translucent. When the syringe piston 23 is moved to feed a desired amount of liquid into the dispenser head 1, the liquid column 5 is formed within the liquid holding portion 11. The material of the liquid holding portion 11 and the liquid are close in refractive index to each other, and therefore the transmission rate of a laser beam will be high. T1 represents a normal value of the laser beam transmission rate obtained when the liquid exists within the liquid holding portion 11.

However, if the syringe 22 or the syringe piston 23 has a fault or if there is a problem with a supply passageway 21, switching means 211 or others, the liquid column 15 is not formed within the liquid holding portion 11. Therefore, the value of the laser beam transmission rate is below the normal value T1. In such a case, the fault judgment portion 62 judges that a fault has developed in the liquid pouring means 2. Namely, the fault judgment portion 62 judges that a fault has developed in any of the syringe 22, the syringe piston 23, a piston drive device 24, the switching means 211 and the supply passageway 21. On the other hand, if the value of the laser beam transmission rate is the normal value T1 after the liquid is poured into the liquid holding portion 11, the fault judgment portion 62 judges that the liquid pouring operation has been properly effected by the liquid pouring means 2 without any trouble.

After the liquid pouring operation is properly finished, the valve of the control means 32 is opened, thereby ejecting the pressurized gas into the dispenser head 1, and the liquid column 5 within the liquid holding portion 11 is blown away by this pressurized gas, so that the value of the laser beam transmission rate will again go below the value T1.

However, if the thin pipe of the liquid discharge portion 12 is clogged, or the gas feed means 3 (the compressor 31, the control means 32, the filter 133 and the gas tubes 34a to 34c) has a fault, the pressurized gas fails to be properly fed, and the liquid column 15 is not blown away and remains in the liquid holding portion 11. As a result, the value of the laser beam transmission rate remains high. In such a case, the fault judgment portion 72 judges that a fault has developed somewhere in the liquid discharge portion 12 and the gas feed means 3.

Thus, the fault judgment portion 62 receives from the liquid detection sensor 61 information as to whether or not the liquid exists within the liquid holding portion 11, and checks it against the state of progress of the liquid supply operation (for supplying the liquid to the exterior), and judges that a fault has developed if the liquid does not exist in the liquid holding portion 11 at the timing at which the liquid should exist there and also if the liquid exists at the timing at which the liquid should not exist.

Next, the operation of the second fault detection means 7 will be described.

FIGS. 10A to 10C show an example of measurement results of the pressure sensors 71a to 71c, and FIG. 10A shows the measurement result in the normal operation, and FIG. 10B shows the measurement result obtained when the dispenser head 1 is clogged, and FIG. 10C shows the measurement result obtained when the filter 133 is clogged. A line A represents the measured pressure of the pressure sensor 71a, a line B represents the measured pressure of the pressure sensor 71b, and a line C represents the measured pressure of the pressure sensor 71c. The ordinate axis represents a pressure value, and the abscissa axis represents time. During a time period from zero to $t_{ON}$, the control means 32 is closed, and during a time period from $t_{ON}$ to $t_{OFF}$, the control means 32 is opened, thereby feeding the pressurized gas so as to discharge the liquid from the liquid discharge portion 12, and at time $t_{OFF}$, the control means 32 is again closed.

In FIG. 10A, during the time period from zero to $t_{ON}$, the pressure C and the pressure B are close to the atmospheric pressure, and the pressure A is the compression pressure of the compressor 31. During the time period from $t_{ON}$ to $t_{OFF}$, the liquid is discharged, and therefore the pressure A becomes closer to the atmospheric pressure, and the pressure C and the pressure B slightly increase. At time $t_{OFF}$, the control means 32 is closed, so that the gas feed system is returned to the initial condition.

If the pressure A does not reach the compression pressure before time $t_{ON}$, then the fault judgment portion 72 can judge that a fault, such as the failure of the compressor 31 to properly operate, has developed.

If the dispenser head 1 is clogged, the pressure A is hardly changed even when the control means 32 is opened at time $t_{ON}$ as shown in FIG. 10B, and the pressure C and the pressure B become closer to the compression pressure of the compressor 31. In this case, it can be judged that the dispenser head 1 has been clogged.

If the filter 133 is clogged, the pressure A and the pressure C are hardly changed even when the control means 32 is opened at time $t_{ON}$ as shown in FIG. 10C, and only the pressure B becomes closer to the compression pressure of the compressor 31. In this case, it can be judged that the filter 133 has been clogged.

Further, if all of the pressures A, B and C are not changed even when the control means 32 is opened and closed, it can be judged that a fault has developed in the control means 32.

The controller 4 controls the operation of the liquid supply apparatus, and also judges faults in the fault judgment portions 62 and 72. If a fault occurs, information regarding to this fault is indicated on the exterior through the controller 4, or an alarm signal is outputted form the controller 4. This fault may be recorded on a recording medium.

Although the liquid supply apparatus of this embodiment is provided with the first fault detection means 6 and the second fault detection means 7, the apparatus may be provided with one of the two detection means 6 and 7. Even in the case where the apparatus is provided only with the first fault detection means 6, the development of a fault in the liquid supply means 2 or the gas feed means 3 can be detected. Also, even in the case where the apparatus is provided only with the second fault detection means 7, a fault, such as the clogging of the gas feed means 3 and the clogging of the dispenser head 1, can be detected.

However, when the apparatus is provided with both of the first and second fault detection means, it can be judged as a whole where and how a fault has developed in the liquid supply apparatus. As a result, the precision of the fault detection operation is enhanced, and also it is easier to specify the place where the fault has developed.

Fourth Embodiment

In the third embodiment, the transmission optical fiber sensor 611 and the optical fiber amplifier 612 are used as the liquid detection sensor 61. However, whether or not the liquid exists within the liquid holding portion 11 can be detected by the use of a capacitance-type sensor.

Figure 11:
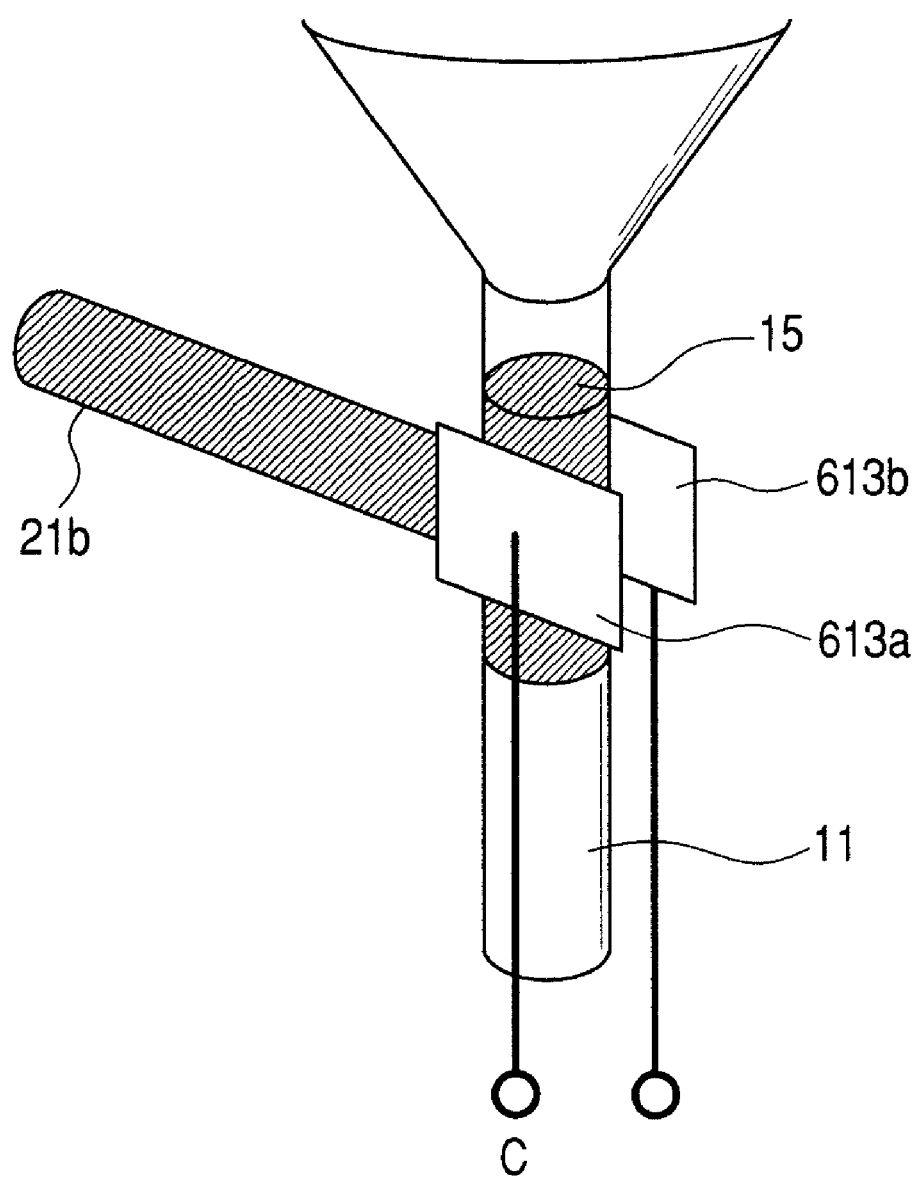
FIG. 11 is a view showing a capacitance-type sensor mounted on a liquid holding portion 11.
Figure 12:
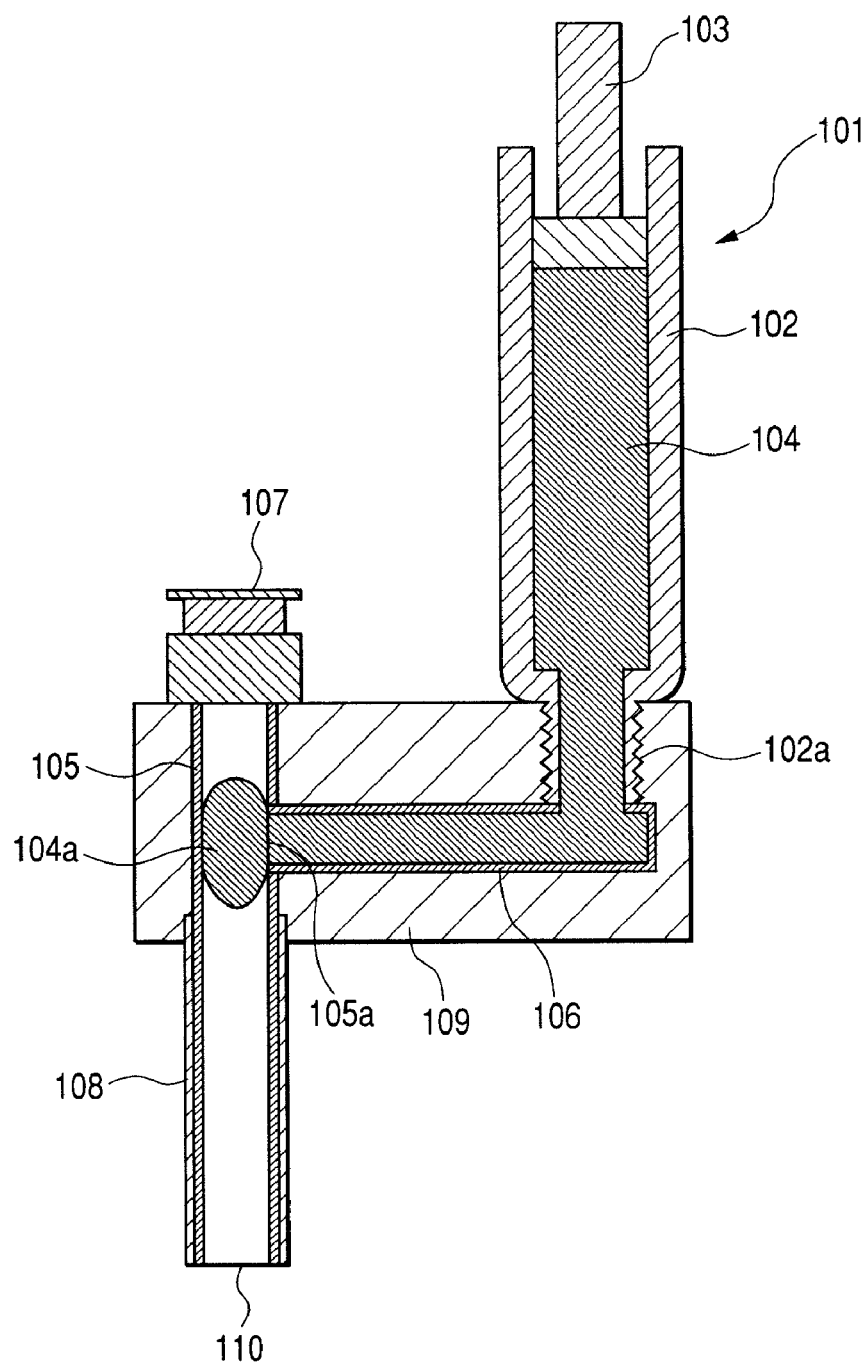
FIG. 12 is a view showing a related-art liquid supply apparatus.

FIG. 11 is a view showing an example in which a capacitance-type sensor is provided on the liquid holding portion 11. Electrodes 613a and 613b are opposed to each other, with the liquid holding portion 11 held therebetween, and capacitance C between theses electrodes is measured. Water and the air greatly differ in capacitance from each other on the order of about 80 times, and therefore when the liquid exists within the liquid holding portion 11, the capacitance C between the electrodes increases. By detecting the value of the capacitance, it can be detected whether or not the liquid exists within the liquid holding portion 11. The measured capacitance C is inputted into the fault judgment portion 62, and a fault such as the clogging can be detected as in the third embodiment employing the optical fiber sensor.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A liquid supply apparatus comprising:
    a liquid holding portion for holding a liquid to be pushed out to the exterior by pressurized gas;
    a liquid pouring section for pouring a predetermined amount of liquid into an intermediate portion of said liquid holding portion, the liquid pouring section comprising a supply passageway connected to said liquid holding portion, a syringe for pouring the liquid into said liquid holding portion via the supply passageway, and a drive section for controlling an amount of movement of a syringe piston of the syringe;
    a switching device provided at the supply passageway, that switches a connecting side of the syringe from the liquid holding portion to a supply source of the liquid
    a liquid discharge portion which comprises a thin pipe smaller in flow passage cross-sectional area than said liquid holding portion, and is connected to one end of said liquid holding portion;
    a liquid storing portion which is larger in flow passage cross-sectional area than said liquid holding portion, and is connected to the other end of said liquid holding portion; and
    a gas feed section for feeding the pressurized gas into said liquid storing portion.

2. A liquid supply apparatus according to claim 1, wherein a connecting portion of said liquid storing portion connected to said liquid holding portion is formed into a tapering shape.

3. A liquid supply apparatus according to claim 1, wherein said gas feed section comprises a compressor for pressurizing the gas, and a control section having a first mode in which the liquid held in said liquid holding portion is pushed out by the gas pressurized by said compressor and a second mode in which said liquid holding portion is open to the ambient atmosphere.

4. A liquid supply apparatus according to claim 1, wherein said liquid discharge portion comprises the thin pipe having a distal end portion drawn into a smaller diameter.

5. A liquid supply apparatus according to claim 1, wherein said liquid discharge portion comprises the thin pipe made of metal, and an inner peripheral surface of said thin pipe is finished into a mirror surface.

6. A liquid supply apparatus according to claim 1, wherein said liquid discharge portion comprises the thin pipe having a water repellent material coated on an inner peripheral surface thereof.

7. A liquid supply apparatus according to claim 1, wherein said liquid discharge portion comprises the thin pipe in the form of a tube made of polytetrafluoroethylene.

8. A liquid supply apparatus according to claim 1, wherein said liquid holding portion has such a flow passage cross-sectional area that a liquid column can be formed within said liquid holding portion by an amount of the liquid corresponding to a minimum of said predetermined amount.

\* \* \* \* \*